US009079277B2

(12) United States Patent
Karasawa et al.

(10) Patent No.: US 9,079,277 B2
(45) Date of Patent: Jul. 14, 2015

(54) STACKING APPARATUS AND MANUFACTURING APPARATUS FOR FLATTENED TUBE FINS

(71) Applicant: HIDAKA SEIKI KABUSHIKI KAISHA, Tokyo (JP)

(72) Inventors: Masanao Karasawa, Tokyo (JP); Yoshitaka Ide, Tokyo (JP); Yasuyuki Morimoto, Kuwana (JP); Kenji Yasui, Kuwana (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 13/862,648

(22) Filed: Apr. 15, 2013

(65) Prior Publication Data

US 2014/0090238 A1 Apr. 3, 2014

(30) Foreign Application Priority Data

Oct. 3, 2012 (JP) ................................ 2012-221466

(51) Int. Cl.

| | |
|---|---|
| ***B23P 15/26*** | (2006.01) |
| ***B21D 43/20*** | (2006.01) |
| ***B21D 53/02*** | (2006.01) |

(52) U.S. Cl.

CPC ................. *B23P 15/26* (2013.01); *B21D 43/20* (2013.01); *B21D 53/022* (2013.01); *Y10T 29/53113* (2015.01)

(58) Field of Classification Search

CPC ...... B23P 15/26; B21D 43/20; B21D 53/022; Y10T 29/53113

See application file for complete search history.

(56) References Cited

U.S. PATENT DOCUMENTS

2012/0222293 A1 9/2012 Ueda et al.

FOREIGN PATENT DOCUMENTS

| | | | |
|---|---|---|---|
| JP | 5-192728 | A | 8/1993 |
| JP | 09-324995 | A | 12/1997 |
| JP | 10-263733 | A | 10/1998 |
| JP | 2003-320433 | A | 11/2003 |
| JP | 2005-114220 | A | 4/2005 |
| KR | 10-2012-0100809 | A | 9/2012 |

*Primary Examiner* — Moshe Wilensky

(74) *Attorney, Agent, or Firm* — Birch, Stewart, Kolasch & Birch, LLP

(57) ABSTRACT

A stacking apparatus capable of stacking flattened tube fins efficiently is provided.

There is provided a stacking apparatus for stacking flattened tube fins, each having a cutaway portion through which a heat exchanger flattened tube is inserted, formed from one side to the other side in a width direction, the stacking apparatus including a stack pin to be inserted into the cutaway portion, and the stack pin has a swing-preventing structure.

1 Claim, 15 Drawing Sheets

100 48 60 66 68 42 44 52 40 46 49 55 53 65 49 72 70 71 41 64 30 51 50 54 62 69 80 B
CONTROL UNIT
110
CONVEYING DIRECTION

CONTROL UNIT
CONVEYING DIRECTION
100
110
B

INITIAL POSITION

FIG18.A

STACKING APPARATUS AND MANUFACTURING APPARATUS FOR FLATTENED TUBE FINS

CROSS-REFERENCE TO RELATED APPLICATION(S)

This application is based upon and claims the benefit of priority of the prior Japanese Patent Application No. 2012-221466, filed on Oct. 3, 2012, the entire contents of which are incorporated herein by reference.

FIELD

The present invention relates to a stacking apparatus for stacking manufactured flattened tubes and a manufacturing apparatus for flattened tube fins including the stacking apparatus.

BACKGROUND

A prior-art heat exchanger, such as an air conditioner, is typically constructed by stacking a plurality of heat exchanger fins in which a plurality of through-holes have been drilled to enable heat exchanger tubes to be inserted.

Such heat exchanger fins are manufactured by a manufacturing apparatus for heat exchanger fins illustrated in FIG. 17.

The manufacturing apparatus for heat exchanger fins is equipped with an uncoiler 12 where a thin metal plate 10 made of aluminum or the like has been wound into a coil. The thin plate 10 pulled out from the uncoiler 12 via pinch rollers 14 is inserted into an oil applying apparatus 16 where machining oil is applied onto the surface of the thin plate 10, and is then supplied to a mold apparatus 20 provided inside a press apparatus 18.

The mold apparatus 20 internally includes an upper mold die set 22 capable of up-down movement and a lower mold die set 24 that is static. A plurality of collar-equipped through-holes (not shown), where collars of a predetermined height are formed around through-holes, are formed at predetermined intervals in a predetermined direction by the mold apparatus 20.

The result of machining the metal thin plate to produce the through-holes and the like is hereinafter referred to as the “metal strip 11”. After being conveyed a predetermined distance in the predetermined direction, the metal strip 11 is cut into predetermined lengths by a cutter 26. The products (heat exchanger fins) produced by such cutting into predetermined lengths are stored in a stacker 28. The stacker 28 has a plurality of stack pins 27 erected in the perpendicular direction and stacks the manufactured heat exchanger fins by inserting the stack pins 27 into the through-holes.

CITATION LIST

Patent Document

Patent Document 1
Japanese Laid-Open Patent Publication No. H05-192728

SUMMARY

Problems to be Solved by the Invention

In a prior-art heat exchanger fin, a plurality of through-holes into which heat exchanger tubes are inserted are drilled in a metal strip.

However, at present, heat exchangers that use multi-channel flattened tubes are being developed. A heat exchanger fin that uses such flattened tubes is illustrated in FIGS. 18A and 18B (and will sometimes be referred to hereinafter as a “flattened tube fin”).

On a flattened tube fin 30, cutaway portions 34 into which the flattened tubes 32 are inserted are formed at a plurality of positions, and plate-like portions 36, where louvers 35 are formed, are formed between cutaway portion 34 and cutaway portion 34.

The cutaway portions 34 are formed from only one side in the width direction of the flattened tube fin 30. Accordingly, the plurality of plate-like portions 36 between cutaway portion 34 and cutaway portion 34 are joined by a joining portion 38 that extends in the length direction.

However, when such flattened tube fin is manufactured by an existing heat exchanger fin manufacturing apparatus, the following problem occurs.

A prior-art heat exchanger fin has a plurality of through-holes formed therein and the manufactured fins are stacked on a stacker 28 where stack pins 27 are disposed so as to penetrate the through-holes.

Since through-holes are not formed in the flattened tube fin described above, when stacking the fins, the stack pins 27 are inserted into the cutaway portions 34.

The cutaway portion 34 has a shape which is narrow in the conveying direction of the flatted tube fin 30 and large in the width direction.

Therefore, for the stack pin 27 to be inserted into the cutaway portion 34, a plate-like member which is thin in the conveying direction and has a substantially rectangular shape when viewed from the front in the conveying direction is employed.

Meanwhile, when a predetermined number of flattened tube fins are stacked on the stacker 28, they are moved from the stacked position, then an empty stacker is moved, and thus the flattened tube fins are stacked thereon.

When the length of the stack pin 27 is small, the number of stackable flattened tube fins decreases, and stackers need to be replaced frequently, which is inefficient in manufacturing.

Therefore, there is a demand that the length of the stack pin 27 should be longer so that as many flattened tube fins 30 as possible can be stacked.

However, as shown in FIG. 19, when the length of the stack pin 27 is increased, a phenomenon was found that the stack pin 27 swings.

The swing of the stack pin 27 occurs in a direction in which the stack pin 27 is thin (the same direction as the conveying direction), after the stack pin 27 is vertically moved when the flattened tube fins 30 are stacked or after a new empty stacker 28 is conveyed to a stack position and stopped.

As described above, when the stack pin 27 swings, the stack pin 27 cannot be accurately inserted into the cutaway portion 34. Therefore, the flattened tube fins 30 cannot be stacked until the swing of the stack pin 27 converges, and manufacture of the flattened tube fin 30 is discontinued.

As described above, if the length of the stack pin 27 is increased in order to manufacture the flattened tube fin 30 efficiently, the swing becomes large and it is likely that manufacturing efficiency rather deteriorates, which is a problem.

The inventors have examined prevention of occurrence of the swing or reduction of convergence time by decreasing amplitude of the swing, while the length of the stack pin 27 is increased and have conceived the present invention.

The present invention was made in order to solve the problem described above and has an object of providing a stacking apparatus capable of rapidly stacking flattened tube fines in which through-holes are not formed and a manufacturing apparatus for manufacturing flattened tube fins which allows efficient manufacturing of the flattened tube fins by using the same.

Solution to the Problems

According to the stacking apparatus according to the present invention, a stacking apparatus for stacking flattened tube fins, each having a cutaway portion through which a heat exchanger flattened tube is inserted, formed from one side to the other side in the width direction is characterized in that a stack pin to be inserted through the cutaway portion is provided, and the stack pin has a swing-preventing structure.

By employing this configuration, swing of the stack pin can be prevented. Therefore, the stack pin is reliably inserted through the cutaway portion of the flattened tube fin.

Moreover, the swing-preventing structure may be characterized by having a holding portion formed thick in order to prevent swing in a thin direction at a position where the flattened tube fins to be stacked do not interfere.

According to this configuration, rigidity of the stack pin is improved by the holding portion, and swing of the stack pin can be prevented.

Furthermore, the swing-preventing structure may be characterized by having an upper portion of the stack pin formed into a small width.

According to this configuration, a mass of the upper portion of the stack pin can be decreased. Thus, inertia moment causing the swing of the stack pin can be reduced, which contributes to prevention of the swing.

According to a manufacturing apparatus for flattened tube pins according to the present invention, in a manufacturing apparatus for manufacturing flattened tube fins in which cutaway portions through which heat exchanger flattened tubes are inserted are formed, a press apparatus including a mold apparatus that forms the cutaway portions in an unmachined thin plate of metal to produce a metal strip, an inter-row slit apparatus which cuts the metal strip, in which the cutaway portions have been formed, into predetermined widths to form a plurality of metal strips having a product width that are arranged in the width direction, a cutoff apparatus that cuts each of the metal strips having the product width into predetermined lengths, and a stacking apparatus for stacking the flattened tube fins cut into predetermined lengths by the cutoff apparatus are provided, wherein the stacking apparatus is including a stack pin inserted through the cutaway portion, and the stack pin has a swing-preventing structure.

By employing this configuration, the stack pin is prevented from swinging. Thus, the stack pin is reliably inserted through the cutaway portion of the flattened tube fin. Thus, there is no need to stop manufacture of the flattened tube fins until the swing converges, and the flattened tube fins can be manufactured efficiently.

Furthermore, the swing-preventing structure may be characterized by having a holding portion formed thick in order to prevent swing in a thin direction at a position where the flattened tube fins to be stacked do not interfere.

According to this configuration, rigidity of the stack pin can be improved by the holding portion, and the swing of the stack pin can be prevented.

Additionally, the swing-preventing structure may be characterized by having the upper portion of the stack pin formed to have a small width.

According to this configuration, a mass of the upper portion of the stack pin can be decreased. Thus, inertia moment causing the swing of the stack pin can be reduced, which contributes to prevention of the swing.

Advantageous Effect of the Invention

According to the present invention, the stack pin can be prevented from swinging. Therefore, the stack pin is reliably inserted through the cutaway portion of the flattened tube fin. Accordingly, there is no need to stop manufacturing of the flattened tube fins until the swing converges, and the flattened tube fins can be manufactured efficiently.

BRIEF DESCRIPTION OF THE DRAWINGS

FIG. 3 is viewed from above.

FIG. 3 is viewed from a front in a conveying direction.

FIG. 7 is viewed from a side face in the conveying direction.

FIG. 10 is viewed from a side face in the conveying direction.

FIGS. 18A and 18B are plan views of the flattened tube fin.

DESCRIPTION OF THE PREFERRED EMBODIMENTS (Entire Configuration of Manufacturing Apparatus)

Figure 1:
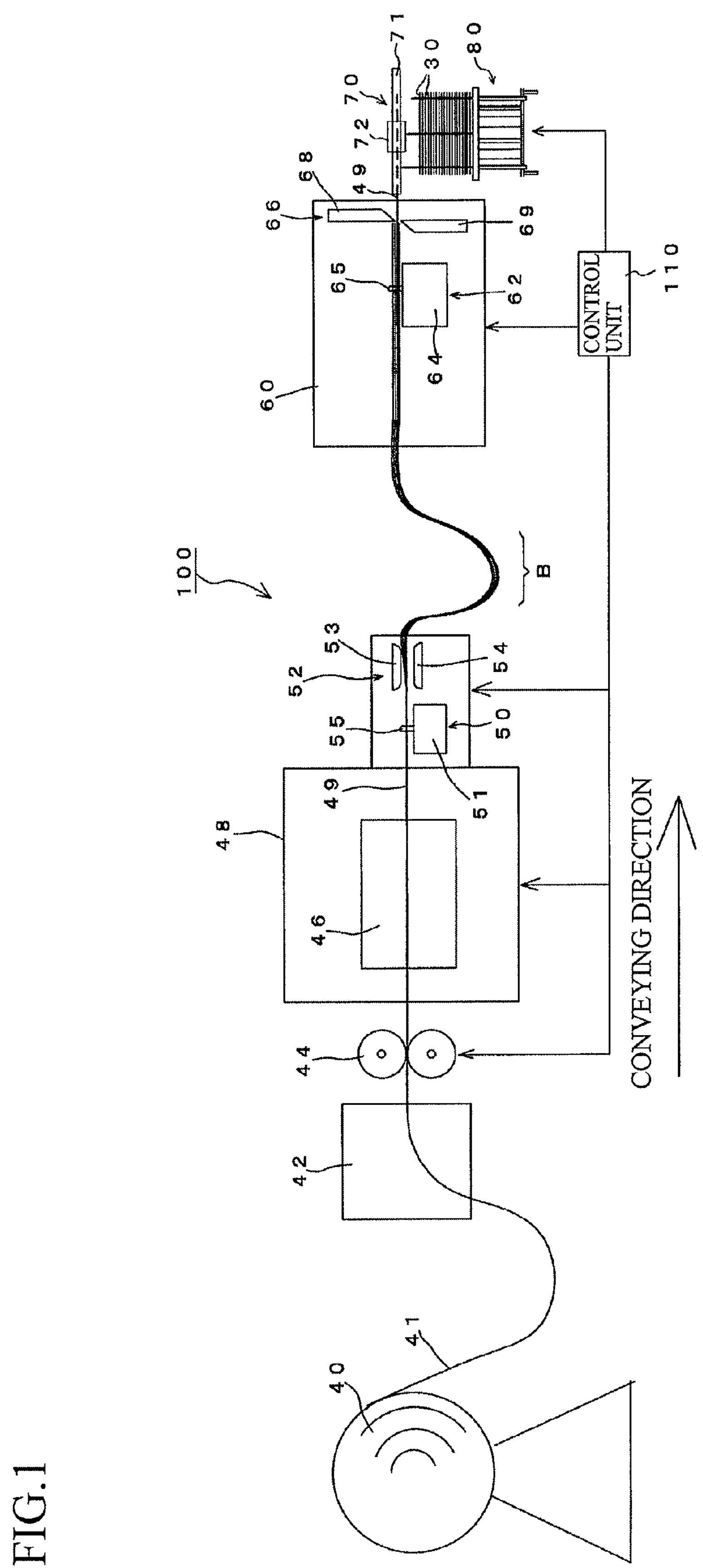
FIG. 1 is a side view illustrating an outline of an entire configuration of a manufacturing apparatus for flattened tube fins according to the present invention.

An entire configuration of a manufacturing apparatus 100 for flattened tube fins according to the present embodiment is illustrated in FIG. 1.

A thin metal plate 41 made of aluminum or the like and is yet to be machined is wound in a coil state on an uncoiler 40. The thin plate 41 pulled out from the uncoiler 40 is inserted into a loop controller 42 and fluctuations in the thin plate 41 that is intermittently fed are suppressed by the loop controller 42.

An NC feeder 44 is provided on the downstream side of the loop controller 42. The NC feeder 44 is composed of two rollers that make contact with the upper surface and the lower surface of the thin plate 41, and by rotational driving of the two rollers, the thin plate 41 is sandwiched and intermittently conveyed by the two rollers.

A press apparatus 48 that has a mold apparatus 46 disposed inside is provided on the downstream side of the NC feeder 44. In the press apparatus 48, the thin plate 41 is formed into a metal strip 49 having a predetermined shape by the mold apparatus 46.

Figure 2:
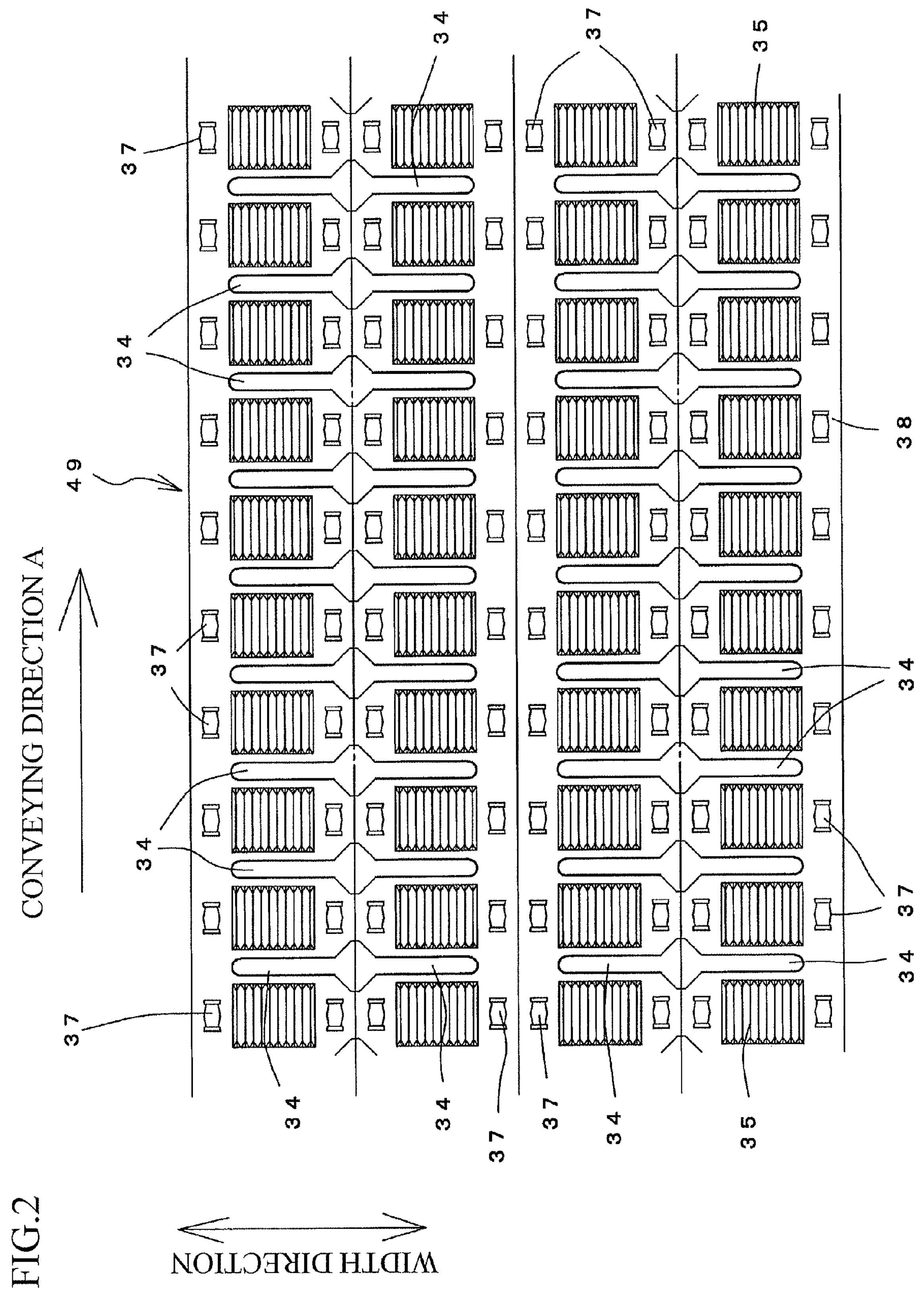
FIG. 2 is a plan view of a metal strip machined by a mold apparatus in FIG. 1.

The metal strip 49 formed in the press apparatus 48 is illustrated in FIG. 2.

The metal strip 49 illustrated in FIG. 2 has four products formed in a line in the width direction of the product perpendicular to an arrow A which is a conveying direction A.

Figure 18B:
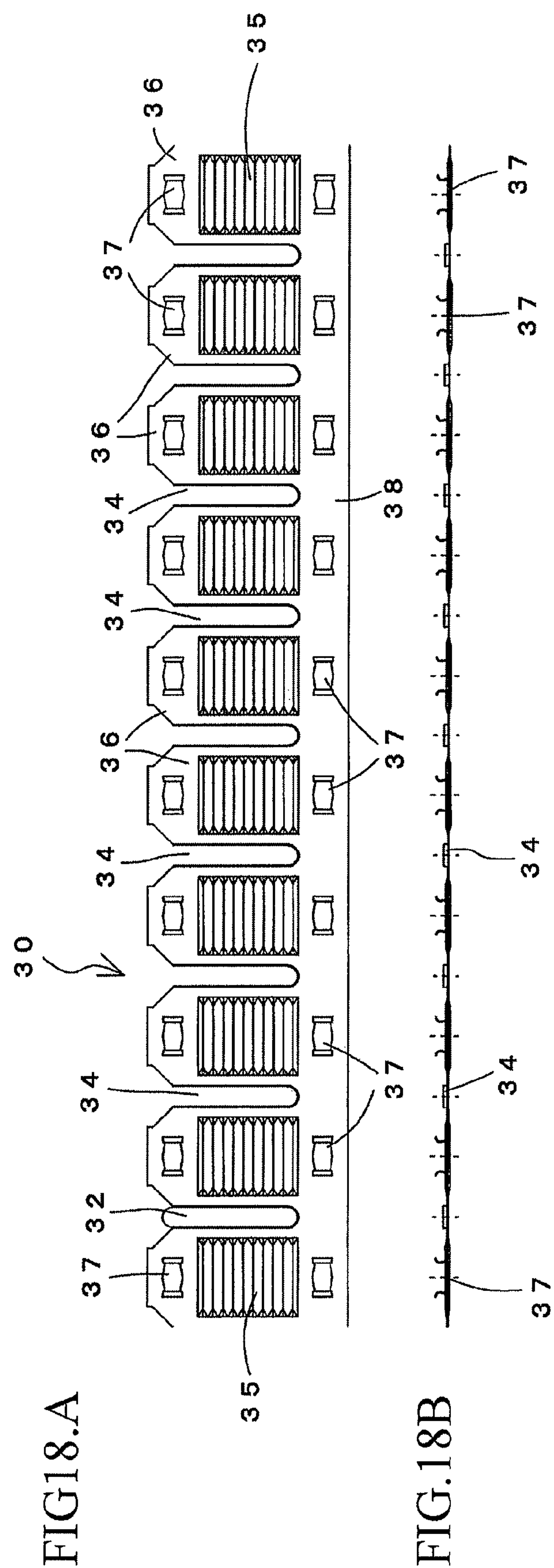
Figure 19:
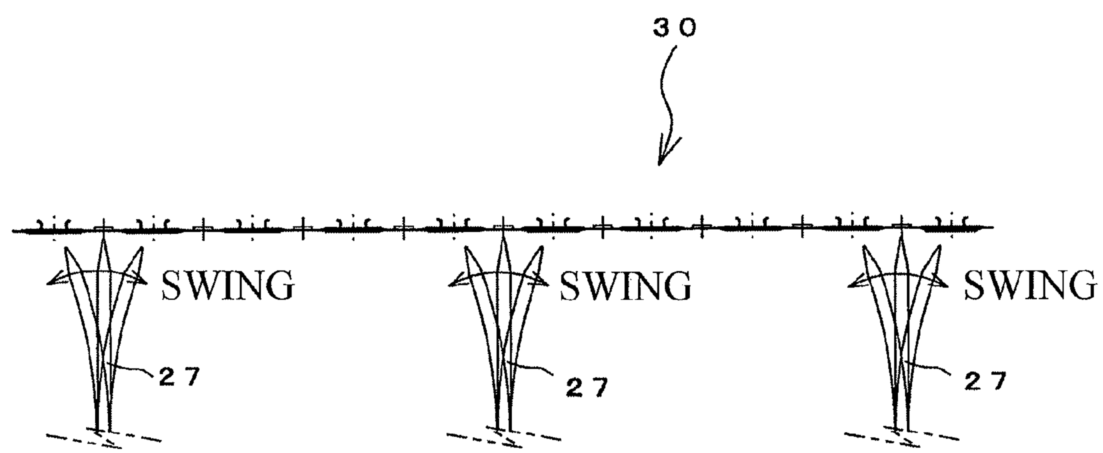
FIG. 19 is an explanatory diagram illustrating swing of the stack pin.

Regarding the specific products formed from the metal strip 49, as illustrated in FIGS. 18A and 18B, each has cutaway portions 34 into which flattened tubes 32 are inserted formed at a plurality of positions, and plate-like portions 36 in which louvers 35 are formed, are formed between cutaway portion 34 and cutaway portion 34. Furthermore, openings 37 formed by cutting and folding up the thin metal plate are formed at both end portion sides in the width direction of the louvers 35. Out of the two openings 37 and 37 formed for one louver 35, one opening 37 is formed at a front end portion side of the plate-like portion 36.

The cutaway portions 34 are formed from only one side in the width direction of the flattened tube fin 30. Accordingly, the plurality of plate-like portions 36 between cutaway portion 34 and cutaway portion 34 are joined by a joining portion 38 that extends continuously in the length direction.

Out of the two openings 37 and 37 for one louver 35 described above, the opening 37 on the other side is formed on the joining portion 38.

On the metal strip 49 illustrated in FIG. 2, two products disposed facing one another with the open sides of the cutaway portions 34 adjacent to one another form a pair, and two of such pairs are formed. That is, the pairs, in which the open sides of the cutaway portions 34 of two products are disposed facing one another, are placed so that the joining portions 38 thereof are adjacent.

In this way, by disposing four products in an alternating arrangement, the left-right load balance of the mold is improved.

Note that, unlike a metal strip such as that illustrated in FIG. 2, if the opening sides of the cutaway portions 34 of a plurality of products were disposed so as to all face in a single direction, when cutting is carried out between the products by an inter-row slit apparatus 52 (described later) that cuts out the products, there would be a high probability that cutting fragments (or "whiskers" or "cutting defects") would be produced between the cutaway portions 34 and the other portions due to displacements in the cutting position. Accordingly, when the opening sides of the cutaway portions 34 of a plurality of products are all disposed so as to face in a single direction, it becomes necessary to cut not at the boundary of the openings of the cutaway portions 34 but to slightly extend the open parts of the cutaway portions 34 as far as a position having entered into a joining portion 38 and to cut at such position. However, in this case, the cross-section becomes stepped and there is deterioration in the left-right load balance of the mold. Accordingly, it is preferable to manufacture a plurality of products with the arrangement depicted in FIG. 2.

The description will now return to the entire configuration of the manufacturing apparatus 100 for flattened tube fins.

The metal strip 49 formed by the mold apparatus 46 in the press apparatus 48 as illustrated in FIG. 1 is conveyed in the conveying direction intermittently by a feeding apparatus 50 provided on the downstream side of the press apparatus 48. The feed timing of the feeding apparatus 50 is provided so as to operate in concert with the NC feeder 44 and makes it possible to perform stable intermittent feeding.

In the feeding apparatus 50, a reciprocating unit 51 capable of moving in the horizontal direction moves reciprocally between an initial position and a conveyed position, to thereby pull the metal strip 49. Feed pins 55 that protrude upward are disposed on the upper surface of the reciprocating unit 51, the feed pins 55 enter from below into the cutaway portions 34 formed into the metal strip 49, and the metal strip 49 is moved to a conveying position by being pulled with the feed pins 55.

The inter-row slit apparatus 52 is provided on the downstream side of the feeding apparatus 50. The inter-row slit apparatus 52 has an upper blade 53 disposed on the upper surface side of the metal strip 49 and a lower blade 54 disposed on the lower surface side of the metal strip 49. The inter-row slit apparatus 52 may be provided so as to operate using an up-down movement operation of the press apparatus 48.

The upper blade 53 and the lower blade 54 are formed so as to be elongated in the conveying direction of the metal strip 49, and the intermittently fed metal strip 49 is cut by the upper blade 53 and the lower blade 54, meshed with each other, to thereby manufacture products (referred to below as "metal strips having the product width" in some cases) in the form of long strips in the conveying direction.

The plurality of metal strips 49 having the product width that have been cut to the product width by the inter-row slit apparatus 52 are fed into a cutoff apparatus 60 provided in a separate body.

Note that, before feeding into the cutoff apparatus 60, the plurality of metal strips 49 having the product width are arranged with predetermined gaps between neighboring metal strips 49 having the product width. Furthermore, before feeding into the cutoff apparatus 60, the plurality of metal strips 49 having the product width are temporarily accumulated for a length that is longer than the length of one conveying operation by the cutoff apparatus 60 and are allowed to sag downward, to thereby form a buffer portion B.

A feeding apparatus 62 that intermittently conveys the respective metal strips 49 each having the product width in the conveying direction is provided inside the cutoff apparatus 60. As the structure of the feeding apparatus 62, there is used a configuration in which it is possible to set the length of one feeding operation to be larger than the structure of the feeding apparatus 50 provided on the downstream side of the press apparatus 48.

In the feeding apparatus 62, a conveying unit 64 that is capable of moving in the horizontal direction moves by a predetermined distance to pull the metal strips 49 having the product width from the press apparatus 48 side and push the metal strips 49 having the product width to the downstream side of the cutoff apparatus 60. On the upper surface of the conveying unit 64, a plurality of feeding pins 65 are disposed so as to protrude upward and are aligned in the horizontal direction in an equal number of rows to the number of metal strips 49 having the product width. The feeding pins 65 enter from below into the cutaway portions 34 formed in the metal strips 49 having the respective product widths, and due to being pulled by the feeding pins 65, the metal strips 49 having respective product widths move as far as a conveyed position.

A cutting apparatus 66 is provided on the downstream side of the feeding apparatus 62 in the cutoff apparatus 60.

The cutting apparatus 66 cuts the metal strips 49 having the respective product widths into predetermined lengths, to thereby form the flattened tube fins 30. The cutting apparatus 66 includes an upper blade 68 disposed on the upper surface side of the metal strips 49 having the respective product widths and a lower blade 69 disposed on the lower surface side of the metal strips 49 having the respective product widths.

By closing the upper blade 68 and the lower blade 69, the metal strips 49 having the respective product widths are cut into predetermined lengths along the conveying direction to manufacture the flattened tube fins 30.

On the downstream side of the cutoff apparatus 60, a holding apparatus 70 and a stacking apparatus 80 that stacks the manufactured flattened tube fins 30 in a plate thickness direction (vertical direction) are provided.

Figure 3:
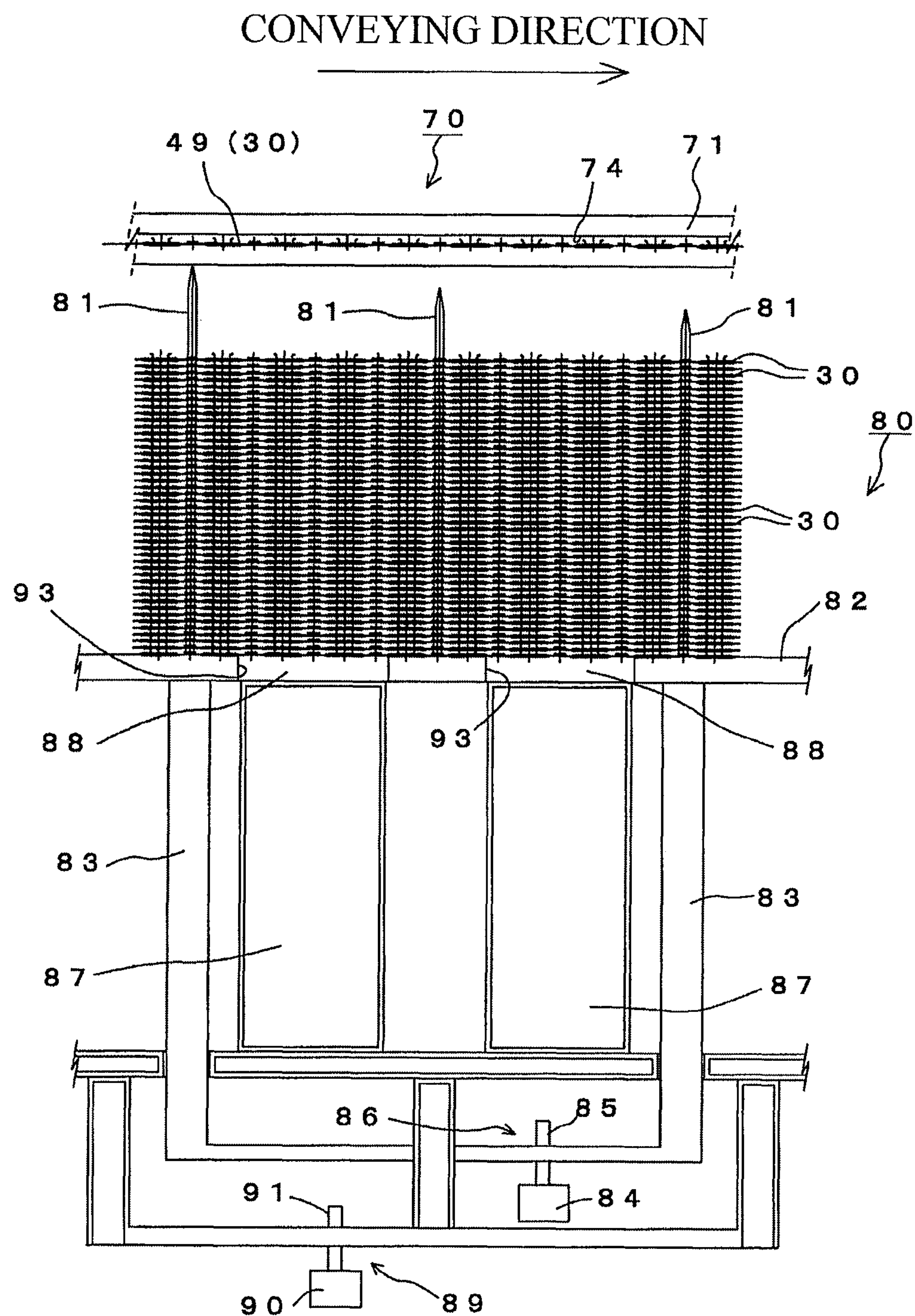
FIG. 3 is a side view of a holding apparatus and a stacking apparatus.
Figure 4:
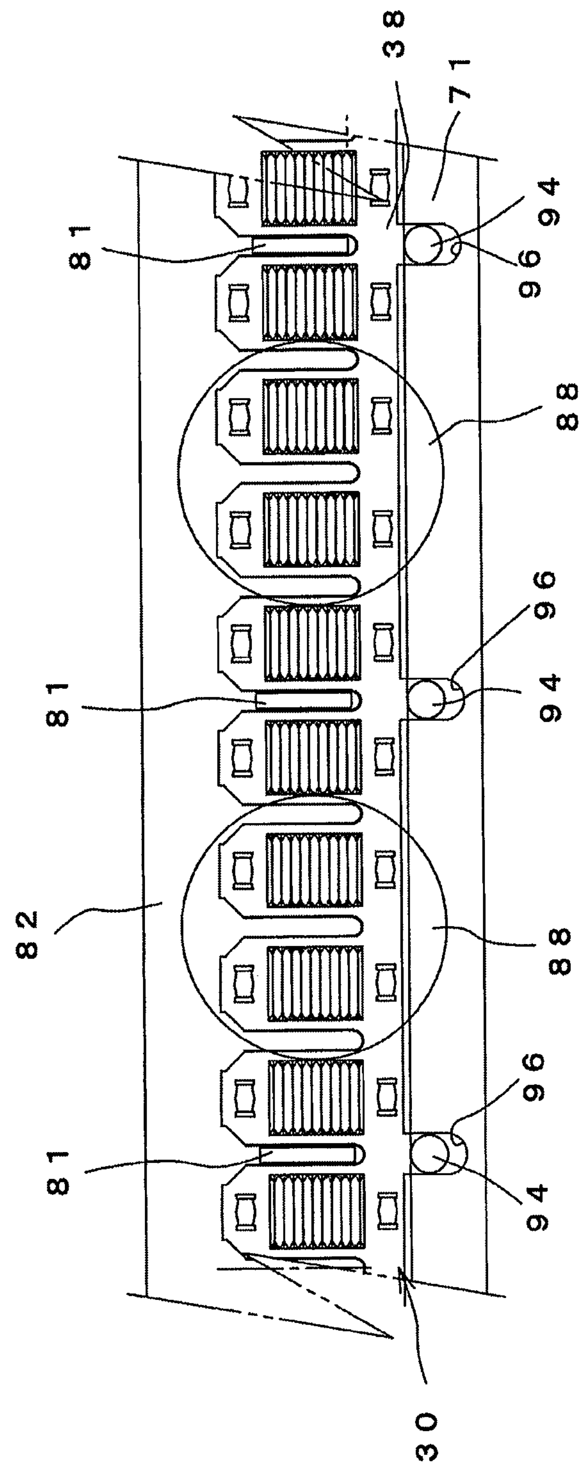
FIG. 4 is a plan view when
Figure 5:
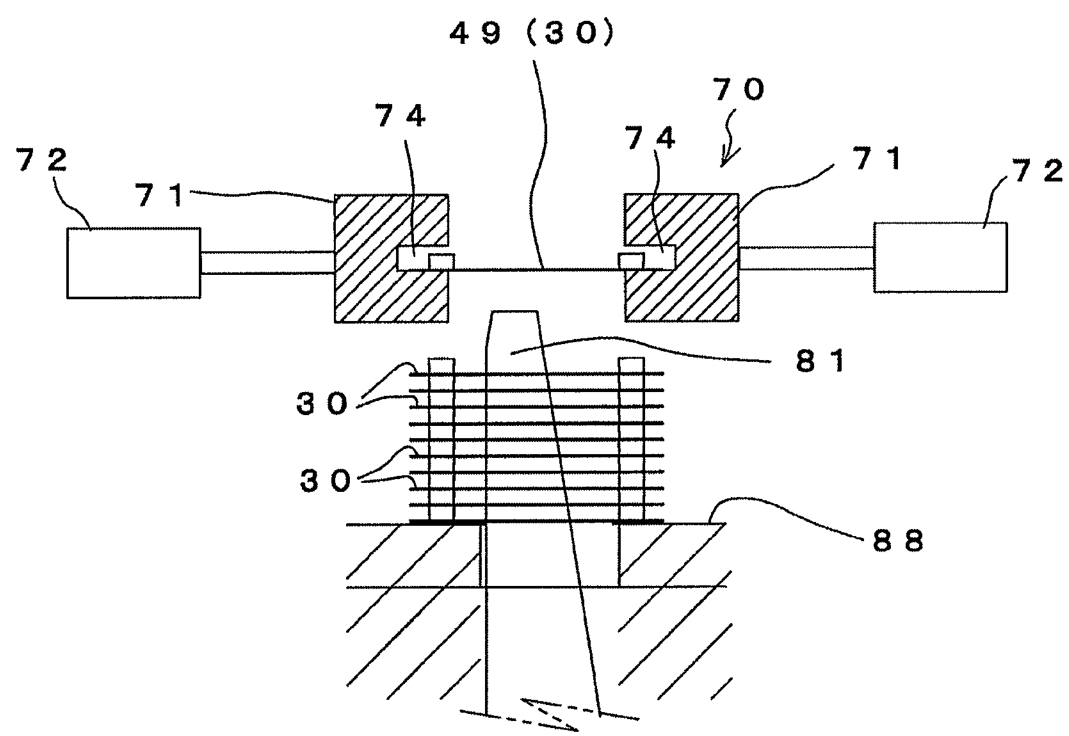
FIG. 5 is a front view when

Note that FIG. 3 illustrates the holding apparatus and the stacking apparatus in FIG. 1 in detail in an enlarged manner. FIG. 4 illustrates a plan view of the flattened tube fins held by the holding apparatus when viewed from above. FIG. 5 illustrates a front view of FIG. 3 when viewed from the downstream side in the conveying direction.

The holding apparatus 70 supports the metal strips 49 having the product width, slidably in the conveying direction, coming out into the conveying direction from the downstream side of the cutoff apparatus 60. Specifically, the holding apparatus 70 has a pair of holding bodies 71 and 71 arranged on the both sides in the width direction of the metal strips 49 having the product width so that the end portions in the width direction of the metal strips 49 having the product width coming out of the cutoff apparatus 60 can be placed. Each of the holding bodies 71 and 71 is formed to have a U-shaped section. When each of the holding bodies 71 and 71 is viewed from the conveying direction, it is formed so that concave portions 74 recessed to the outside in the width direction oppose each other.

The holding apparatus 70 like this can maintain the metal strip 49 having the product with in a holding state from the time before it is not yet cut to the time after it is cut into the predetermined length by the cutting apparatus 66 and formed into the flattened tube fins. 30.

Moreover, each of the holding bodies 71 and 71 is provided movably in a direction where they approach each other/separate from each other (horizontal direction). As an approaching/separating unit having the holding bodies 71 and 71 approach each other/separate from each other, a cylinder 72 is provided (omitted in the drawings other than FIGS. 1 and 5).

The stacking apparatus 80 has a stack pin base portion 82 having a substantially flat plate shape on which a plurality of stack pins 81 (three in the drawing) are installed upright, a support leg 83 that supports the stack pin base portion 82, and a stack-pin vertically-moving device 86 which is provided below the support leg 83 and vertically moves the support leg 83.

In the present embodiment, a servo motor 84 and a ball screw 85 connected to an output shaft of the servo motor 84 correspond to the stack-pin vertically-moving device 86.

First Embodiment of a Stack Pin

A first embodiment of the stack pin will be described.

Figure 6A:
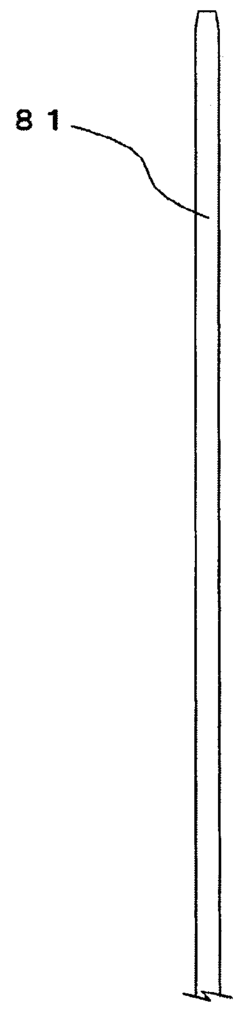
FIGS. 6A and 6B are a side view and a front view of a first embodiment of a stack pin, respectively.
Figure 6B:
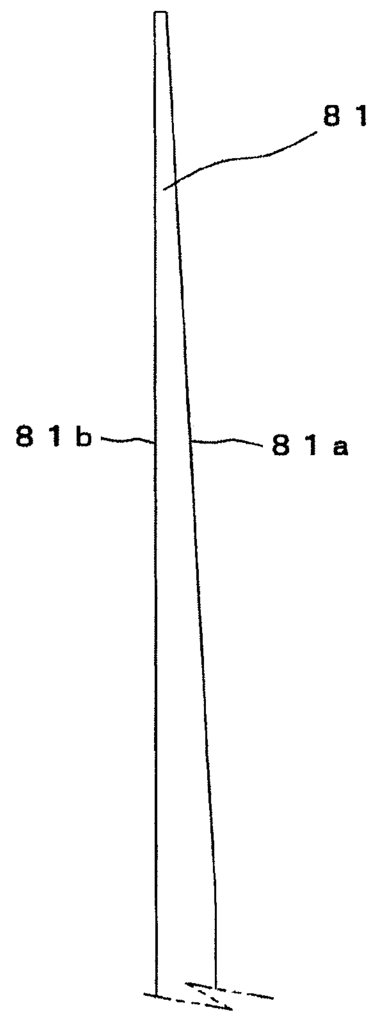

The shape of the stack pin 81 in the present embodiment is illustrated in FIGS. 6A and 6B. FIG. 6A is a side view when viewed from a side face with respect to the conveying direction, and FIG. 6B is a front view when viewed from a front in the conveying direction.

Figure 7:
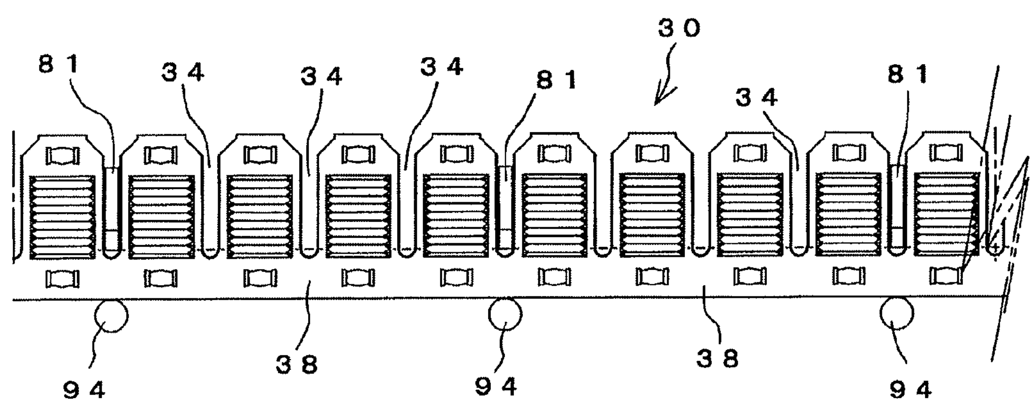
FIG. 7 is a plan view illustrating a state where the flattened tube fins are stacked by the stack pin in the first embodiment.
Figure 8:
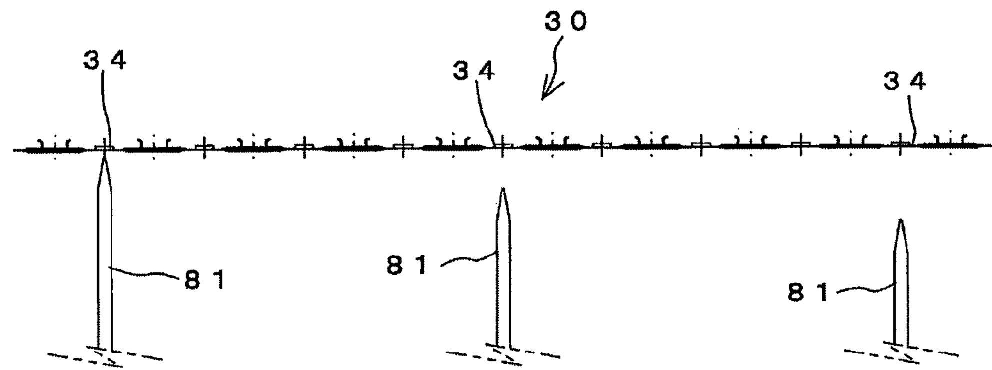
FIG. 8 is a side view when

FIG. 7 illustrates a plan view in which the stack pin 81 of the present embodiment is inserted through the cutaway portion 34 of the flattened tube fin 30, and FIG. 8 illustrates a side view of FIG. 7.

The stack pin 81 is formed such that its upper portion has a small width. This configuration in which the upper portion has a small width is the swing-preventing structure for preventing swing of the stack pin 81.

Note that, in the stack pin 81 of the present embodiment, an end portion 81*a* corresponding to the opening side of the cutaway portion 34 is formed to have a tapered shape whose width gradually becomes smaller from the lower portion to the upper portion. Thus, the upper portion of the stack pin 81 has a smaller width.

In contrast, an end portion 81*b* on the side of the joining portion 38 opposite to the opening side of the cutaway portion 34 in the stack pin 81 is formed to have a vertically linear shape extending in the vertical direction. Since the end portion on the joining portion 38 side of the cutaway portion 34 needs to be brought into contact with the end portion 81*b* of the stack pin 81 for positioning, the end portion 81*b* on the joining portion 38 side opposite to the opening side of the cutaway portion 34 in the stack pin 81 needs to be formed to have a vertically linear shape extending in the vertical direction.

As described above, by forming the stack pin 81 so as to have a small width on the upper portion, a mass of the upper portion of the stack pin 81 can be reduced. Thus, the inertia moment causing the swing of the stack pin can be reduced, which can contribute to prevention of the swing.

Note that, even if the upper portion as the swing-preventing structure is made to have a small width, the swing of the stack pin 81 cannot be fully prevented in some cases, but amplitude of the swing can be reduced anyway. If the amplitude of the swing is reduced, time until convergence of the swing can be reduced, and the flattened tube fins 30 can be manufactured efficiently.

As described above, by preventing the swing of the stack pin 81 or by reducing the amplitude of the swing, the entire length (height) of the stack pin 81 can be prolonged, and the stacking amount of the flattened tube fins 30 can be increased.

Moreover, by preventing the swing of the stack pin 81 or by reducing the amplitude of the swing, position accuracy at the distal end of the stack pin 81 is improved, and thus, the flattened tube fins 30 can be reliably stacked.

In the stack pin 81 of the present embodiment, the side located on the end portion on the opening side of the cutaway portion 34 is formed to have a tapered shape which gradually narrows toward the upper portion.

However, as long as the mass of the upper portion of the stack pin 81 can be reduced and the swing can be prevented, the shape of the stack pin 81 may be any shape.

Note that the distal end portion of the stack pin 81 may be formed sharply or may be formed to have a rounded shape.

Second Embodiment of the Stack Pin

A second embodiment of the stack pin 81 will be described.

Figure 9A:
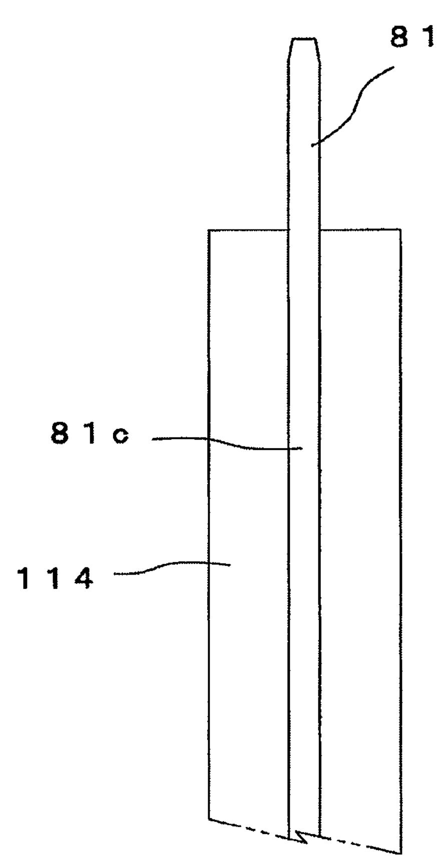
FIGS. 9A and 9B are a side view and a front view of a second embodiment of a stack pin, respectively.
Figure 9B:
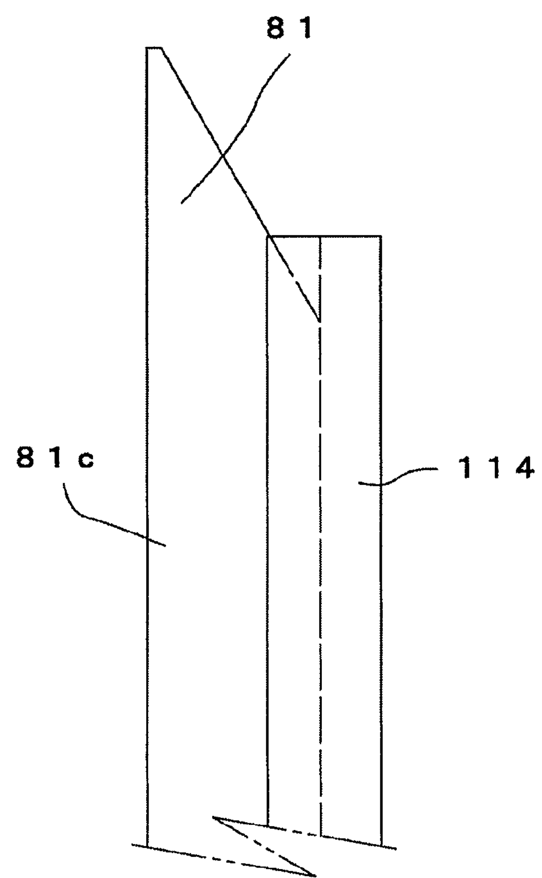

The shape of the stack pin 81 in the second embodiment is illustrated in FIGS. 9A and 9B. FIG. 9A is a side view when viewed from the side face to the conveying direction and FIG. 9B is a front view when viewed from the front in the conveying direction.

Figure 10:
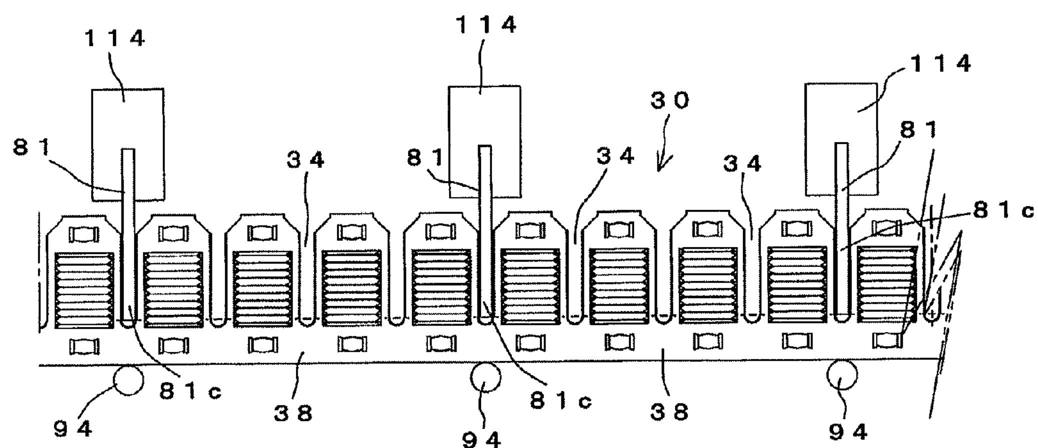
FIG. 10 is a plan view illustrating a state where the flattened tube fins are stacked by the stack pin of the second embodiment.
Figure 11:
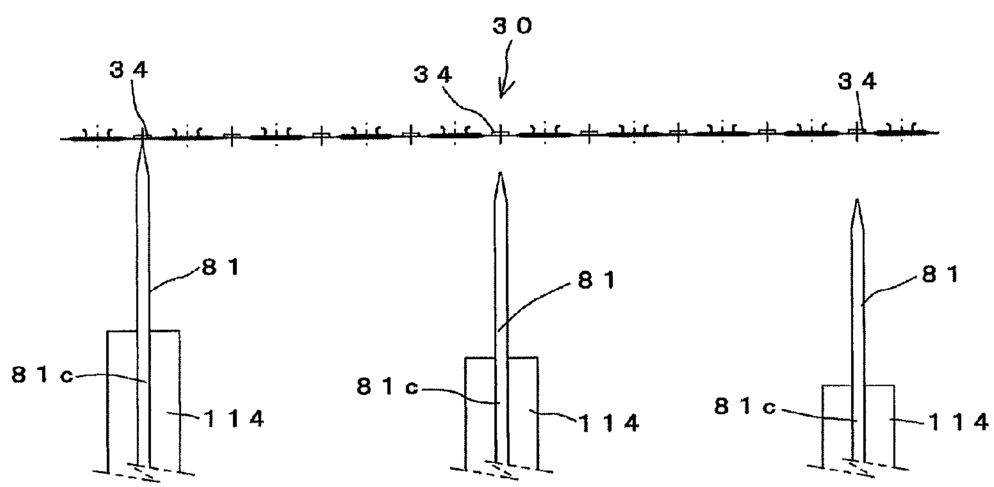
FIG. 11 is a side view when
Figure 12:
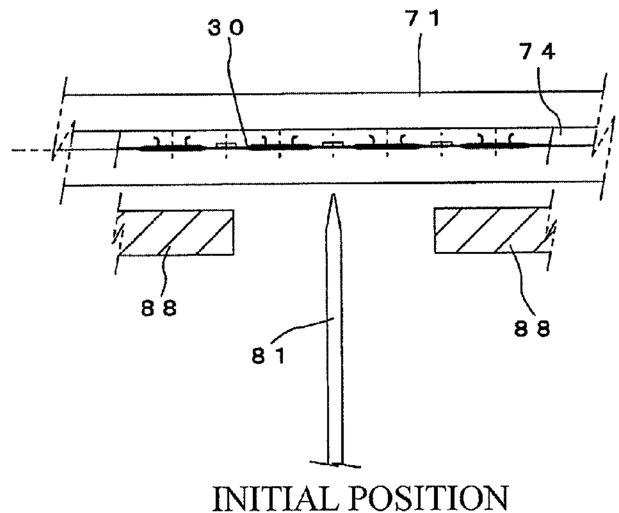
FIG. 12 is a side view illustrating operations of the holding apparatus and the stacking apparatus when the first flattened tube fin is to be stacked.

FIG. 10 illustrates a plan view in which the stack pin 81 of the present embodiment is inserted through the cutaway portion 34 of the flattened tube fin 30, and FIG. 11 illustrates a side view of FIG. 10.

The stack pin 81 includes a holding portion 114 that holds a thin insertion portion on the outside of an insertion portion 81*c* to be inserted through the cutaway portion 34. The holding portion 114 is the swing-preventing structure that prevents swing of the stack pin 81.

Note that, even when the holding portion 114 as the swing-preventing structure is provided on the stack pin 81, the swing of the stack pin 81 is not fully prevented in some cases, but amplitude of the swing can be reduced anyway. By the reduction in the amplitude of the swing, the time until convergence of the swing can be reduced, and the flattened tube fins 30 can be manufactured efficiently.

As illustrated in FIG. 9A, since the insertion portion 81*c* of the stack pin 81 is formed thin in the conveying direction, if there is no holding portion 114 and only the insertion portion 81*c* is present, reciprocal swing can easily occur in the conveying direction. However, by providing the thick holding portion 114 in the conveying direction, the swing of the stack pin 81 can be prevented, the entire length (height) of the stack pin 81 can be prolonged, and the stacking amount of the flattened tube fins 30 can be increased.

By preventing the swing of the stack pin 81, position accuracy at the distal end of the stack pin 81 is improved, and thus the flattened tube fins 30 can be reliably stacked.

In the present embodiment, as illustrated in FIG. 9B, the end portion on the opening side of the cutaway portion 34 in the width direction of the stack pin 81 is formed to have a tapered shape which gradually narrows toward the upper portion, but the shape does not have to be such tapered shape.

The holding portion 114 in the present embodiment employs a rectangular shape which is long in the vertical direction, but any shape can be employed as long as it can prevent swing of the entire stack pin 81. For example, the holding portion 114 may have columnar shape.

Furthermore, the holding portion 114 of the present embodiment is formed separately from the insertion portion 81*c* of the stack pin 81. Specifically, a groove extending in the vertical direction is formed in the holding portion 114, and the end portion on the opening side of the cutaway portion 34 of the stack pin 81 is inserted into and fixed in this groove.

However, the holding portion 114 does not have to be configured separately from the stack pin 81, but the stack pin 81 and the holding portion 114 may be configured integrally.

Moreover, since the holding portion 114 has a size that cannot be inserted into the cutaway portion 34, it is preferably arranged outside the opening portion side of the cutaway portion 34 of the flattened tube fin 30. If the holding portion 114 is located at such a position, the holding portion and the flattened tube fin 30 do not interfere with each other.

Note that the distal end portion of the stack pin 81 may be formed sharply or may be formed to have a rounded shape.

(Explanation of a Regulating Pin)

Moreover, FIGS. 4, 7, and 10 illustrate a state where the regulating pin 94 is provided (omitted in the other drawings).

The regulating pin 94 is installed upright at the same position as the position where the stack pin 81 is installed upright in the conveying direction of the metal strip 49 having the product width, and at the position in contact with a side end edge of the joining portion 38 of the metal strip 49 having the product width. That is, the regulating pin 94 is arranged at a position such that the joining portion 38 of the metal strip 49 having the product width is sandwiched by the stack pin 81 and the regulating pin 94 in the width direction.

The regulating pin 94 is installed upright on the upper surface of the stack pin base portion 82 similarly to the stack pin 81.

If the regulating pin 94 like this is installed upright, a regulating pin-avoiding portion 96 for avoiding interference with the regulating pin 94 is formed in the holding body 71. The regulating pin-avoiding portion 96 can be configured as a concave cutaway portion in which a part of end edge on the opposite surface side is partially cut away in a direction (width direction) orthogonal to the conveying direction of the metal strip 49 having the product width, on one of the holding bodies 71 disposed in an opposing state as illustrated in FIG. 4.

As described above, by installing the stack pin 81 and the regulating pin 94 upright on the upper surface of the stack pin base portion 82, after the metal strip 49 having the product width is subjected to cutoff processing and divided into individual flattened tube fins 30, when the flattened tube fins 30 are to be stacked on the stacking apparatus 80, movement of the flattened tube fins 30 in the width direction is regulated by the stack pin 81 and the regulating pin 94, and shifting of the flattened tube fins 30 in the width direction is eliminated. That is, the flattened tube fins 30 are stacked in a more organized manner with respect to the stack pin base portion 82.

Furthermore, the stacking apparatus 80 has the fin receiving portion 88 which moves vertically and separately from the vertical movement of the stack pin 81 and on which the flattened tube fins 30 can be placed. On the lower side of the fin receiving portion 88, a support leg 87 extending downward so as to support the fin receiving portion 88, and a receiving portion vertically-moving device 89 which is provided below the support leg 87 and which vertically moves the support leg 87, are provided.

Moreover, the receiving portion vertically-moving device 89 is provided separately from the stack pin vertically-moving device 86 and can operate separately from the stack pin base portion 82.

The receiving portion vertically-moving device 89 in the present embodiment is composed of a servo motor 90 and a ball screw 91 connected to an output shaft of the servo motor 90.

The fin receiving portion 88 is formed having an upper face with a plane shape so that the flattened tube fins 30 can be stacked thereon. In contrast, the stack pin base portion 82 is also formed having an upper face with a plane shape so that the flattened tube fins 30 can be stacked thereon.

As illustrated in FIG. 4, in the present embodiment, the stack pin base portion 82 has a wider area. The fin receiving portion 88 has a circular shape when viewed from the upper surface and has an area smaller than that of the stack pin base portion 82. Specifically, at a predetermined position of the stack pin base portion 82, a circular passage hole 93 through which the fin receiving portion 88 can pass is formed, and the stack pin base portion 82 and the fin receiving portion 88 can vertically move freely without interfering with each other.

Note that the state illustrated in FIG. 3 where the stack pin base portion 82 and a fin receiving portion 88 are at the same height position, and the upper surfaces of both the stack pin base portion 82 and the fin receiving portion 88 are on the same plane. The flattened tube fins 30 are placed on the upper surfaces of the stack pin base portion 82 and the fin receiving portion 88 which make the flush plane.

(Explanation of Operations of Holding Apparatus and Stacking Apparatus)

Subsequently, on the basis of FIGS. 12, 13 and 14A to 14C, the configurations and operations of the holding apparatus 70 and the stacking apparatus 80 when a single piece of the flattened tube fin 30 is to be stacked on the stacking apparatus 80 will be described. Note that the following explanation will be made on the basis of the stack pin of the first embodiment whose upper portion has a small width as a configuration of the stack pin.

First, before the metal strip 49 having the product width passes through (is fed out) the positions of the upper blade 68 and the lower blade 69 in the cutting apparatus 66 in the cutoff apparatus 60, the cylinder 72 is extended and set at a position capable of holding the metal strip 49 having the product width on the both side end edges in the width direction and the bottom surface by each of the respective concave portions 74, each having a U-shape, of the pair of holding bodies 71.

When the pair of holding bodies 71 are set at the positions for holding the both-side end edges and the bottom surface of the metal strip 49 having the product width, the metal strip 49 having the product width is fed out by the feeding apparatus 62. The metal strip 49 having the product width is guided in the conveying direction while being held so as not to drop along a guide space formed by the pair of holding bodies 71 arranged in a state where the concave portions 74 are opposed to each other.

When the metal strip 49 having the product width has been conveyed by the feeding apparatus 62 to a predetermined length, the feeding apparatus 62 stops once.

After that, the servo motor 84 of the stack-pin vertically-moving device 86 is driven and raises the stack pin base portion 82. Note that, in the present embodiment, the lengths of the three stack pins 81 are provided so as to gradually become shorter as it advances in the conveying direction (that is, the height positions of the upper ends of the three stack pins 81 become gradually lower as they go away from the cutoff apparatus 60. Therefore, if the stack pin base portion 82 is raised, the stack pins 81 are inserted in order from the cutaway portion 34 on the cutoff apparatus 60 side to the metal strip 49 having the product width having been fed out of the cutoff apparatus 60.

Since the stack pins 81 are inserted in order from the cutaway portion 34 on the cutoff apparatus 60 side, the stack pin 81 is first inserted into the cutaway portion 34 on the cutoff apparatus 60 side where less positional shifting occurs. Thus, lateral shifting of the distal-end side portion in the conveying direction of the metal strip 49 having the product width can be corrected, and the stack pins 81 can be reliably inserted into all the cutaway portions 34.

When all the stack pins 81 (three stack pins 81 in the present embodiment) have been inserted into the cutaway portions 34 of the metal strip 49 having the product width, the cutting apparatus 66 of the cutoff apparatus 60 performs cutting processing on the metal strip 49 having the product width at a predetermined position, and the metal strip 49 having the product width is divided into the individual pieces of the flattened tube fin 30.

As described above, when the metal strip 49 having the product width is subjected to the cutting processing, since the stack pin 81 is inserted into the cutaway portion 34 and the metal strip 49 having the product width is held in a positioned state, accurate cutting processing can be performed. That is, the flattened tube fins 30 with high dimensional accuracy can be obtained.

The flattened tube fins 30 divided into the individual pieces by the cutting apparatus 66 are held by each of the holding bodies 71 in a state where the stack pins 81 are inserted into the cutaway portions 34 similarly to a state before being divided into the individual pieces.

Moreover, the fin receiving portion 88 which receives the first flattened tube fins 30 is arranged at a position raised from the stack pin base portion 82 in advance so that a drop distance of the flattened tube fin 30 is made as short as possible by the receiving portion vertically-moving device 89.

Figure 13:
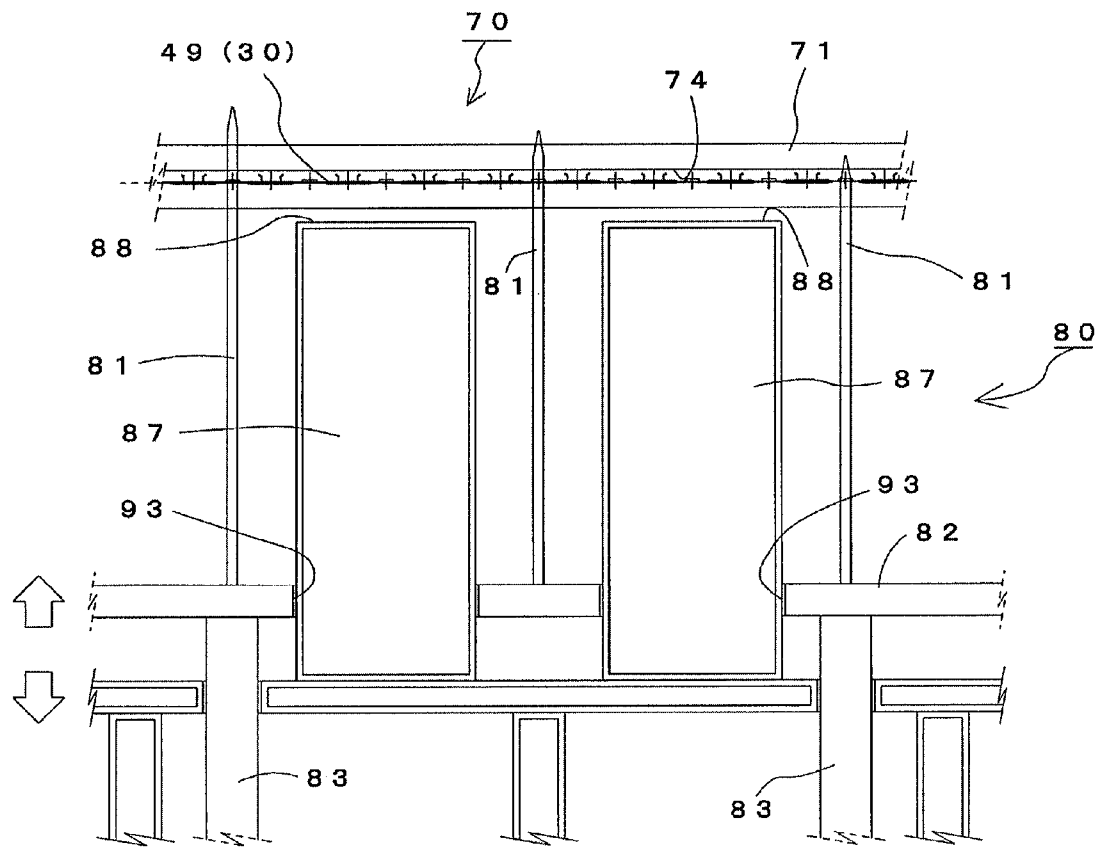
FIG. 13 is a side view of the holding apparatus and the stacking apparatus illustrating initial positions of the stack pin and a fin receiving portion when the first flattened tube fin is to be stacked.
Figure 14C:
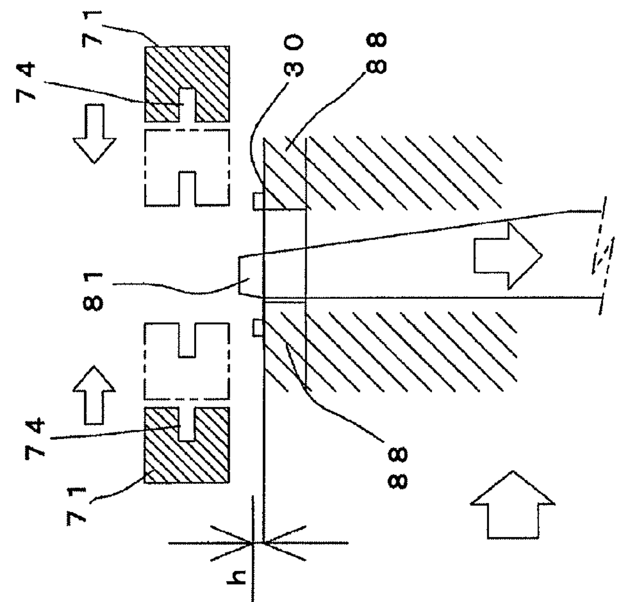
FIGS. 14A, 14B, and 14C are front views illustrating operations of the holding apparatus and the stacking apparatus when viewed from a front in the conveying direction when the first flattened tube fin is to be stacked.
Figure 14B:
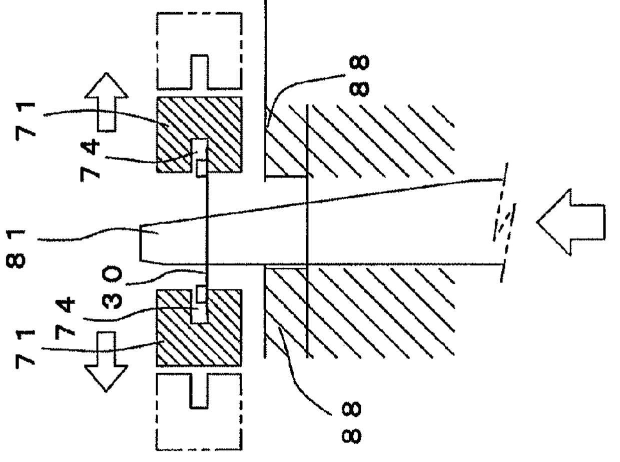
Figure 14A:
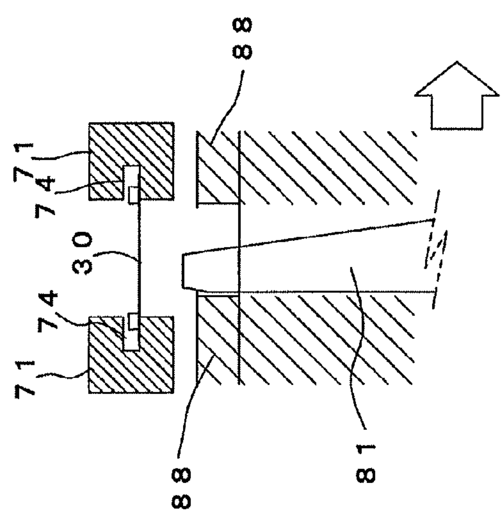

FIG. 14A illustrates FIG. 13 when viewed from the front side in the conveying direction. Here, the metal strip 49 having the product width is divided into individual pieces of the flattened tube fins 30 cut to the predetermined length.

In FIG. 14B, first, the stack-pin vertically-moving device 86 is driven, and the stack pin 81 is inserted into the cutaway portion 34 of the flattened tube fin 30.

Subsequently, the cylinder 72 which is an approaching/separating unit of the holding bodies 71 and 71 is contracted and horizontally moves each of the pair of holding bodies 71 in directions which separate them from the flattened tube fins 30. When each holding body 71 horizontally moves and releases holding of the flattened tube fins 30, the flattened tube fins 30 drop on the stack pin base portion 82 along the stack pins 81 inserted into the cutaway portions 34. At this time, since a distance between the upper surface of the fin receiving portion 88 and a holding surface (inner bottom surface of the concave portion 74) of the flattened tub fins 30 of the holding body 71 is extremely slight, the drop distance can be short, and the flattened tube fins 30 can be stacked on the stack pin base portion 82 in an organized manner.

As illustrated in FIG. 14C, after the flattened tube fins have dropped onto the fin receiving portion 88, the stack-pin vertically-moving device 86 is driven and lowers the stack pins 81 to the initial position (the position in FIGS. 13 and 14A). This is because if the stack pin 81 is not lowered to this position, it will get in the way of conveying the subsequent metal strip 49 having the product width.

In addition, separately from the lowering operation of the stack pin 81, the fin receiving portion 88 is also lowered. The lowering operation of the fin receiving portion 88 is performed by driving of the receiving portion vertically-moving device 89. A lowering distance h of the fin receiving portion 88 is approximately the thickness of one flattened tube fin 30 in the vertical direction. Each time the single flattened tube fin 30 drops, the fin receiving portion 88 lowers only by approximately the thickness of the flattened tube fin 30 in the vertical direction. Thus, the drop distance of the flattened tube fins 30 can be configured such that the upper surface of the stacked flattened tube fin 30 does not get in the way of the holding body 71 while a short distance is maintained all the time.

Furthermore, in FIG. 14C, the cylinder 72 which is the approaching/separating unit of the holding bodies 71 and 71 extends and causes the pair of holding bodies 71 to approach each other and horizontally moves them to the initial position where the metal strip 49 having the product width to be held next can be held.

Note that the lowering operation of the stack pin 81 and the lowering operation of the fin receiving portion 88 can be performed in any order or may be performed at the same time. Meanwhile, the operation of causing the holding bodies 71 to approach each other is preferably performed at least after the lowering operation of the fin receiving portion 88 so as not to be brought into contact with the flattened tube fins 30 stacked on the fin receiving portion 88.

Subsequently, on the basis of FIGS. 15 and 16A to 16C, the configurations and operations of the holding apparatus 70 and the stacking apparatus 80 after the two or more flattened tube fins 30 are stacked will be described.

Figure 15:
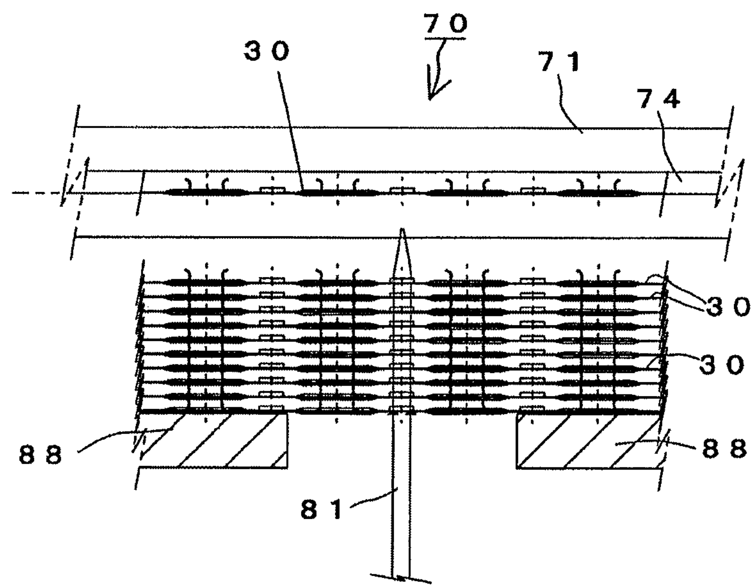
FIG. 15 is a side view of the holding apparatus and the stacking apparatus illustrating the initial positions of the stack pin and the fin receiving portions when a flattened tube fin is to be stacked on the stacking apparatus in which a plurality of fins have been already stacked.

FIG. 15 illustrates that a plurality of the flattened tube fins 30 have been already stacked on the stacking apparatus 80 and the metal strip 49 having the product width held by the holding apparatus 70 is formed into individual pieces of the flattened tube fins 30 cut to the predetermined length.

Figure 16C:
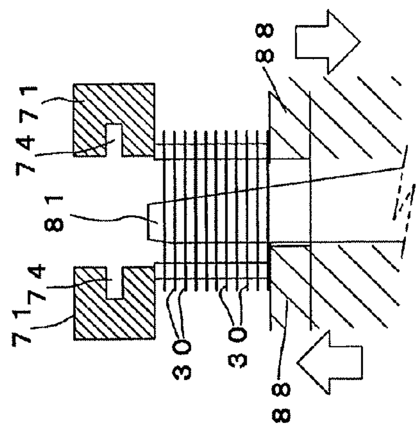
FIGS. 16A, 16B, and 16C are front views illustrating the operations of the holding apparatus and the stacking apparatus when viewed from the front in the conveying direction when a flattened tube fin is to be stacked on the stacking apparatus in which a plurality of fins have been already stacked.
Figure 16B:
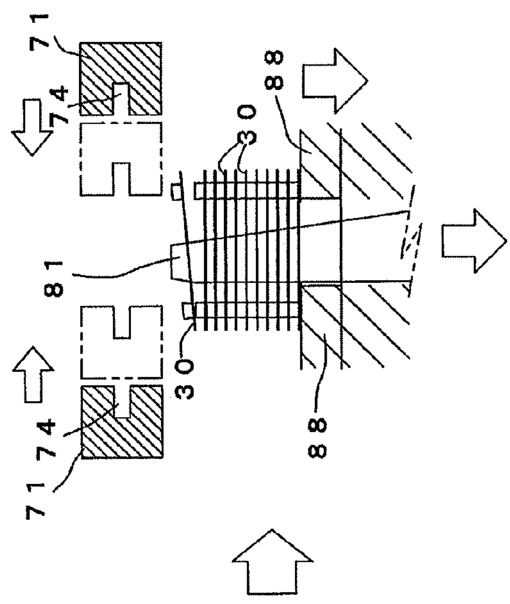
Figure 16A:
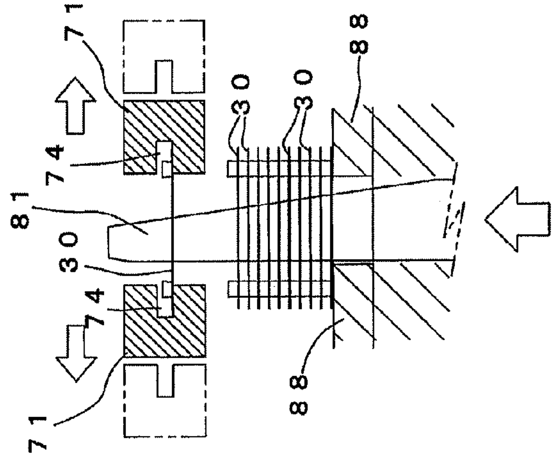
Figure 17:
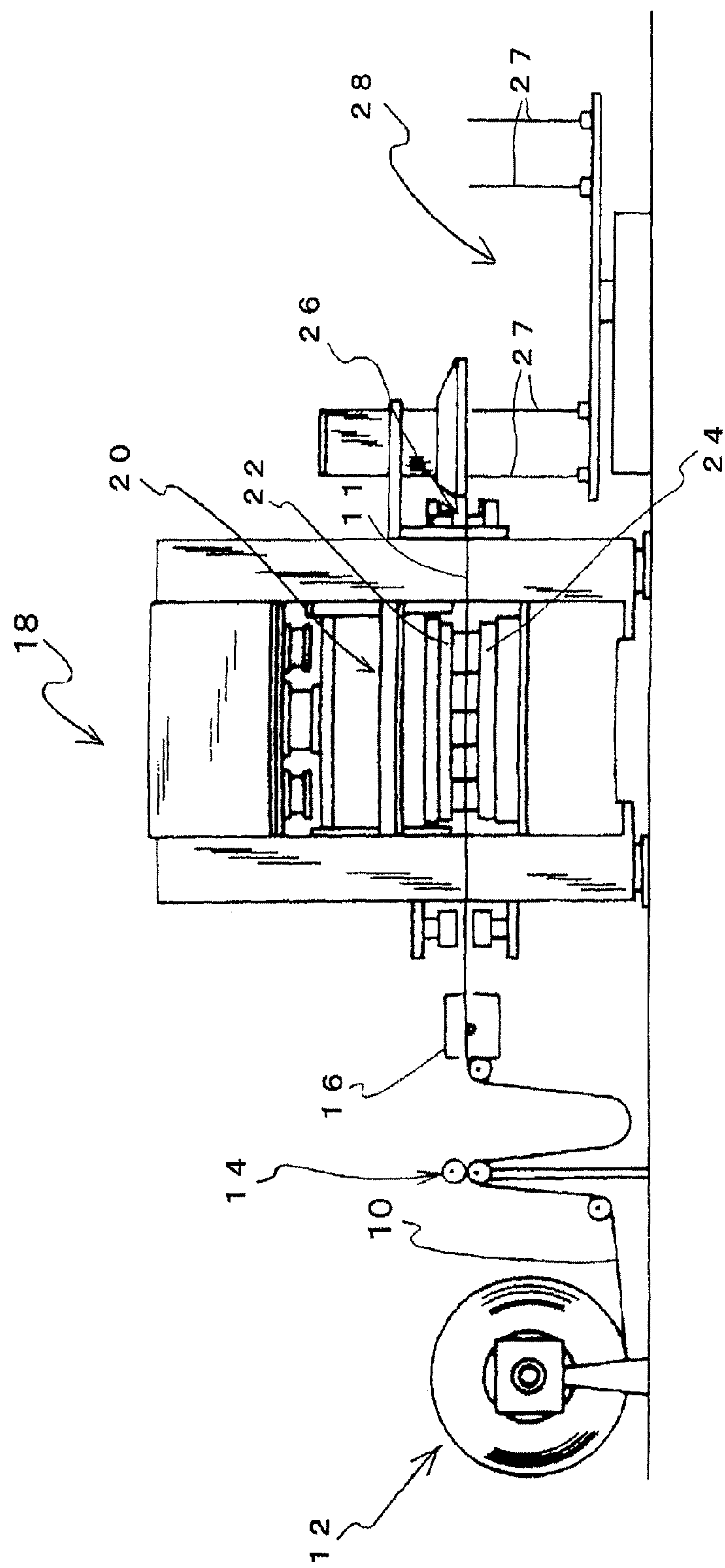
FIG. 17 is a side view illustrating an outline of an entire configuration of an existing manufacturing apparatus for heat exchanger fins.

Then, in FIGS. 16A to 16B, first, the stack-pin vertically-moving device 86 is driven and the stack pin 81 is inserted into the cutaway portion 34 of the flattened tube fin 30.

Subsequently, the cylinder 72 which is the approaching/separating unit of the holding bodies 71 and 71 is contracted and horizontally moves each of a pair of holding bodies 71 in a direction separated away from the flattened tube fins 30. By releasing holding of the flattened tube fin 30 through horizontal move of each holding body 71, the flattened tube fin 30 drops onto the uppermost portion of the stacked flattened tube fins 30 along the stack pin 81 inserted into the cutaway portion 34.

At this time, since the distance between the upper surface of the uppermost portion of the stacked flattened tube fins 30 and the holding surface of the flattened tube fin 30 (inner bottom surface of the concave portion 74) of the holding body 71 is extremely slight, the drop distance can be short, and the flattened tube fins 30 can be stacked in an organized manner.

Furthermore, in FIG. 16B, after the flattened tube fins 30 have dropped onto the fin receiving portion 88, the stack-pin vertically-moving device 86 is driven and lowers the stack pins 81 to the initial position (the position in FIG. 14A). This is because if the stack pin 81 is not lowered to this position, it will get in the way of conveying the subsequent metal strip 49 having the product width.

Moreover, separately from the lowering operation of the stack pin 81, the fin receiving portion 88 is also lowered. The lowering operation of the fin receiving portion 88 is performed by driving of the receiving portion vertically-moving device 89. A lowering distance of the fin receiving portion 88 is approximately the thickness of one flattened tube fin 30 in the vertical direction. Each time the single flattened tube fin 80 drops, the fin receiving portion 88 lowers only by approximately the thickness of the flattened tube fin 30 in the vertical direction. Thus, the drop distance of the flattened tube fins 30 can be configured such that the upper surface of the stacked flattened tube fin 30 does not get in the way of the holding body 71 while a short distance is maintained all the time.

Furthermore, after the drop of the flattened tube fins 30, the cylinder 72 which is the approaching/separating unit of the holding bodies 71 and 71 extends and causes the pair of holding bodies 71 to approach each other and horizontally moves them to the initial position where the metal strip 49 having the product width to be held next can be held.

Note that the lowering operation of the stack pin 81 and the lowering operation of the fin receiving portion 88 may be performed in any order or may be performed at the same time. Meanwhile, the operation of causing the holding bodies 71 to approach each other is preferably performed at least after the lowering operation of the fin receiving portion 88 so as not to be brought into contact with the flattened tube fins 30 stacked on the fin receiving portion 88.

In FIG. 16C, the fin receiving portion 88 is raised by driving of the receiving portion vertically-moving device 89 and brings the upper surface of the flattened tube fin 30 located on the uppermost portion of the stacked flattened tube fins 30 into contact with the lower surface of each holding body 71.

By means of such operation, even if the flattened tube fins 30 stacked on the fin receiving portion 88 are somewhat inclined and the stacked state is not satisfactory, the upper surface and the lower surface of the stacked flattened tube fins 30 are pressed between the fin receiving portion 88 and each holding body 71, and the flattened tube fins can be brought into an orderly aligned and stacked state.

Then, after the upper surface of the stacked flattened tube fin 30 is brought into contact with the lower surface of the holding body 71, the fin receiving portion 88 is lowered by driving of the receiving portion vertically-moving device 89.

The lowered position of the fin receiving portion 88 is a position where, when the subsequent flattened tube fin 30 drops, the dropped flattened tube fin 30 is received.

Note that the above-described series of operations are repeated until the number of the flattened tube fins 30 stacked on the stacking apparatus 80 reaches a predetermined number.

When the number of the flattened tube fins 30 stacked on the stacking apparatus 80 reaches the predetermined number, the stack pin base portion 82 is removed from the support leg 83, and the operations can be transferred to the subsequent process in a state where the stack pin 81 is inserted into the cutaway portion 34.

When stacking of the flattened tube fins 30 is to be resumed, it can be performed by attaching, to the support leg 83, the empty stack pin base portion 82 on which the plurality of stack pins 81 are installed upright.

As described above, separately from the vertical movement of the stack pin 81, the vertical movement of the fin receiving portion 88 is performed, and furthermore, the lowering distance of the fin receiving portion 88 is approximately the thickness of a single piece of the flattened tube fin 30, and the fin receiving portion 88 is raised only by a distance by which the upper surface of the uppermost portion of the stacked flattened tube fins 30 is brought into contact with the lower surface of the holding body 71. Since the rising distance is a distance from a receiving position where the dropped flattened tube fin 30 is received to the lower surface of the holding body 71, the distance is extremely short.

Therefore, the time for the vertical movement of the fin receiving portion 88 can be reduced, a manufacturing cycle for a single piece of the flattened tube fin can be reduced, and production efficiency can be enhanced.

Note that the above-described operations of the holding apparatus 70 and the stacking apparatus 80 are controlled by a control unit 110 and executed (See FIG. 1).

Meanwhile, the control unit 110 executes not only the control of the holding apparatus 70 and the stacking apparatus 80 but also has to synchronize each apparatus constituting a manufacturing apparatus 100 for the flattened tube fins, and thus executes the operation of the entire manufacturing apparatus 100 for the flattened tube fins.

That is, the series of operations of the NC feeder 44, the press apparatus 48, the feeding apparatus 50, the inter-row slit apparatus 52, the cutoff apparatus 60, the holding apparatus 70, and the stacking apparatus 80 each are controlled by the control unit 110 in terms of synchronous operations.

As the control unit 110 like this, a sequencer in which a control program is stored in a memory device and which has a central processing unit (CPU) for performing an operation on the basis of the control program, a personal computer and the like can be used.

Note that, as illustrated in FIGS. 3, 8, and 11, the height position of the upper end portion of each stack pin 81 installed upright on the stack pin base portion 82 is formed so that the height position of the stack pin 81 installed upright on the upstream side (cutoff apparatus 60 side) in the conveying direction of the metal strip 49 having the product width is the highest and the position of the upper end height of the stack pin 81 gradually lowers as it goes to the downstream side (spaced apart from the cutoff apparatus 60) in the conveying direction.

Specifically, the length dimension of the stack pin 81 installed upright on the stack pin base portion 82 is configured to become gradually smaller from the upstream side to the downstream side in the conveying direction of the metal strip 49 having the product width.

By employing such configuration of the stack pin 81, the stack pins 81 are inserted into the cutaway portion 34 of the metal strip 49 having the product width in order from the cutoff apparatus 60 side (the upstream side in the conveying direction).

Since the feeding-out position of the metal strip 49 having the product width on the cutoff device 60 side is extremely close to or coincides with the feeding-out position on design, there is no concern that the stack pin 81 is shifted when it is inserted into the cutaway portion 34 of the metal strip 49 having the product width. By inserting the stack pin from the cutoff apparatus 60 side, the position of the downstream-side distal end edge in the conveying direction of the metal strip 49 having the product width can be corrected to the design position.

Therefore, a shift of the insertion position of the stack pins 81 with respect to all the cutaway portions 34 of the metal strip 49 having the product width can be prevented, and damage of the metal strip 49 having the product width caused by the stack pin 81 can be prevented.

Note that, in the above-described embodiment, there is described an embodiment in which the inter-row slit apparatus 52 is provided in order to produce in parallel the plurality of flattened tube fins 30 aligned in the width direction for the unmachined thin plate 41 made of metal.

However, the configuration of the inter-row slit apparatus 52 can be omitted if one piece of the flattened tube fin 30 is taken in the width direction of the thin plate 41 by using the thin plate 41 made of metal formed into an elongated strip. In addition, when the plurality of flattened tube fins 30 are manufactured at the same time in the width direction of the thin plate 41 similarly to the above-described embodiment, in order to maintain the right-and-left balance of a mold, it is preferable that the even number of the flattened tube fins 30 are arranged in the width direction of a single thin plate as much as possible and the cutaway portions 34 facing each other in a pair is provided.

Furthermore, in the above-described embodiment, the holding body 71 having a U-shaped cross-sectional shape is described, but it is only necessary that the holding body 71 has a bottom surface and a side surface as the concave portion 74 recessed at least to the outside in the width direction and specifically, a configuration of the holding body 71 formed to have an L-shaped section or a C-shaped section may be employed.

Moreover, regarding the above-described holding body 71, the embodiment continuing in the feeding-out direction of the metal strip 49 is described, but an embodiment in which a plurality of holding bodies 71 formed to have a required length in the length direction of the flattened tube fins 30 are disposed at predetermined intervals may be employed. By arranging such that the stack pin 81 and the regulating pin 94 enter the disposition interval portion between the holding bodies 71, interference of the regulating pin 94 with the holding body 71 can be prevented.

In addition, the cylinder 72 is employed as the approaching/separating unit of the holding body 71 in the above-described embodiment, but the unit is not particularly limited to the cylinder as long as the holding body 71 can be moved.

Furthermore, there is described the embodiment in which the servo motor and the ball screw connected to the output shaft of the servo motor are employed as the stack-pin vertically-moving device 86 and the receiving portion vertically-moving device 89. However, each of the vertically-moving devices is not limited to the combination of the servo motor and the ball screw of the above-described embodiment.

What is claimed is:

1. A manufacturing apparatus for manufacturing flattened tube fins, each having a cutaway portion through which a heat exchanger flattened tube is inserted, formed from one side to the other side in a width direction, comprising:

a press apparatus including a mold apparatus that forms the cutaway portions in an unmachined thin plate of metal to thereby produce a metal strip;

an inter-row slit apparatus that cuts the metal strip in which the cutaway portions have been formed, into predetermined widths to thereby form a plurality of metal strips having a product width, being arranged in the width direction;

a cutoff apparatus that cuts the metal strips having the product width into predetermined lengths; and a stacking apparatus for stacking flattened tube fins, each having a cutaway portion through which a heat exchanger flattened tube is inserted, formed from one side to the other side in a width direction, comprising:

a stack pin to be inserted into the cutaway portion, wherein the stack pin has a swing-preventing structure, and in the swing-preventing structure, an end portion of a stack pin on an opening side of the cutaway portion of a flattened tube fin is formed in a taper so as to become gradually narrower from a bottom toward a tip thereof, and an end portion of a stack pin on an opposite side to the opening side of the cutaway portion of the flattened tube fin is formed as a vertical column that extends in a vertical direction, said stacking apparatus stacking the flattened tube fins cut into predetermined lengths by the cutoff apparatus.

* * * * *